US012143240B2

(12) United States Patent
Suzuki et al.

(10) Patent No.: US 12,143,240 B2
(45) Date of Patent: Nov. 12, 2024

(54) VEHICLE CONTROL DEVICE, VEHICLE CONTROL METHOD AND RECORDING MEDIUM IN WHICH VEHICLE CONTROL PROGRAM IS RECORDED

(71) Applicant: TOYOTA JIDOSHA KABUSHIKI KAISHA, Toyota (JP)

(72) Inventors: Masayuki Suzuki, Toyota (JP); Hikaru Shibata, Okazaki (JP); Kohei Nishi, Togo (JP); Hironobu Hatanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 525 days.

(21) Appl. No.: 17/650,140

(22) Filed: Feb. 7, 2022

(65) Prior Publication Data

US 2022/0278870 A1 Sep. 1, 2022

(30) Foreign Application Priority Data

Feb. 26, 2021 (JP) ................................. 2021-031045

(51) Int. Cl.
*H04L 12/40* (2006.01)
*G06F 1/3287* (2019.01)

(52) U.S. Cl.
CPC ............ *H04L 12/40* (2013.01); *G06F 1/3287* (2013.01); *H04L 2012/40215* (2013.01); *H04L 2012/40273* (2013.01)

(58) Field of Classification Search
CPC ........... H04L 12/40; H04L 2012/40215; H04L 2012/40273; G06F 1/3287
See application file for complete search history.

(56) References Cited

U.S. PATENT DOCUMENTS 6,885,289 B1\* 4/2005 Nakai ................. B60R 25/1001
340/687
2004/0243285 A1\* 12/2004 Gounder ............. G07C 5/0858
701/1

(Continued)

FOREIGN PATENT DOCUMENTS

JP 2016-126716 A 7/2016
JP 2018-20678 A 2/2018

(Continued)

OTHER PUBLICATIONS

Japanese Office Action issued Feb. 6, 2024 in Japanese Patent Application No. 2021-031045, citing documents 15 and 16, 2 pages.

*Primary Examiner* — Peter D Nolan
*Assistant Examiner* — Wae L Louie
(74) *Attorney, Agent, or Firm* — Oblon, McClelland, Maier & Neustadt, L.L.P.

(57) ABSTRACT

A vehicle control device including a communication section, a first microcomputer that can communicate with an exterior via the communication section and a second microcomputer that cannot communicate directly with the exterior and can communicate with the first microcomputer. The communication section receives a control signal from the exterior, based on the control signal received by the communication section, the first microcomputer controls operation of an object of control, and outputs the control signal to the second microcomputer. In a case in which a state of the object of control that corresponds to the control signal and a state exhibited by the object of control differ, the second microcomputer effects control so as to stop operation of the communication section.

7 Claims, 10 Drawing Sheets

(56) References Cited

U.S. PATENT DOCUMENTS

| | | | |
|---|---|---|---|
| 2013/0204484 A1* | 8/2013 | Ricci | G06F 17/00 701/29.6 |
| 2015/0220414 A1* | 8/2015 | Mucke | G06F 11/3065 710/19 |
| 2019/0141070 A1* | 5/2019 | Tsurumi | B60R 16/0232 |
| 2019/0260225 A1 | 8/2019 | Hida et al. | |
| 2019/0367041 A1* | 12/2019 | Nakano | G06F 21/554 |
| 2020/0307632 A1* | 10/2020 | Tsuji | B60W 60/0059 |
| 2021/0184491 A1 | 6/2021 | Hida et al. | |
| 2022/0271559 A1* | 8/2022 | Shibata | G01R 31/3835 |
| 2022/0278870 A1* | 9/2022 | Suzuki | H04L 12/40 |
| 2023/0411986 A1* | 12/2023 | Suzuki | H02J 7/0063 |

FOREIGN PATENT DOCUMENTS

| | | |
|---|---|---|
| JP | 2019-146305 A | 8/2019 |
| JP | 2021-013135 A | 2/2021 |

* cited by examiner

VEHICLE CONTROL DEVICE, VEHICLE CONTROL METHOD AND RECORDING MEDIUM IN WHICH VEHICLE CONTROL PROGRAM IS RECORDED

CROSS-REFERENCE TO RELATED APPLICATION

This application is based on and claims priority under 35 USC 119 from Japanese Patent Application No. 2021-031045 filed on Feb. 26, 2021, the disclosure of which is incorporated by reference herein.

BACKGROUND

Technical Field

The present disclosure relates to a vehicle control device, a vehicle control method and a recording medium in which vehicle control program is recorded.

Related Art

Japanese Patent Application Laid-Open (JP-A) No. 2018-020678 discloses an electronic control device that can efficiently detect trouble with control microcomputers. In JP-A No. 2018-020678, in a case in which each of plural control microcomputers receives the same data from a CAN communication bus, a given microcomputer monitors whether or not the communication data, which the other microcomputers output to the CAN communication bus, is normal, and trouble with the other microcomputers is thereby detected efficiently (refer to, for example, paragraph [0009] of JP-A No. 2018-020678).

In a case in which plural microcomputers exist in a single device such as disclosed in above-described JP-A No. 2018-020678, there are cases in which an abnormality arises at any of the microcomputers among the plural microcomputers. In a case in which an abnormality arises at a microcomputer of the device, the exterior of the device must be made to know of that state.

With regard to this point, in above-described JP-A No. 2018-020678, a CAN transceiver that serves as a communication section is connected to the respective, plural microcomputers. Therefore, in a case in which an abnormality arises at another microcomputer, a microcomputer in the device can notify the exterior of this abnormality via the CAN transceiver connected thereto.

On the other hand, there are also cases in which, differently than the structure of above-described JP-A No. 2018-020678, some of the microcomputers in a device cannot communicate directly with the exterior. In such a case, it is assumed that, when an abnormality arises at a microcomputer that can communicate directly with the exterior, the exterior will not be notified of the abnormality. This is because the microcomputer that can communicate directly with the exterior is, itself, in an abnormal state, and further, a microcomputer that cannot communicate directly with the exterior cannot notify the exterior of the abnormality.

Thus, the technique of above-described JP-A No. 2018-020678 has the problem that, in a device that has plural microcomputers, in a case in which an abnormality arises at a microcomputer that can communicate directly with the exterior of the device, there are times when the exterior cannot be notified of the abnormality.

SUMMARY

In view of the above-described circumstances, in the present disclosure, in a device that has plural microcomputers, even in a case in which an abnormality arises at a microcomputer that can communicate directly with the exterior of the device, notification of the abnormality is given to the exterior.

A vehicle control device of a first aspect is a vehicle control device that has: a communication section; a first microcomputer that can communicate with an exterior via the communication section; and a second microcomputer that cannot communicate directly with the exterior and can communicate with the first microcomputer, wherein the communication section receives a control signal from the exterior, and, based on the control signal received by the communication section, the first microcomputer controls operation of an object of control, and outputs the control signal to the second microcomputer, and, in a case in which a state of the object of control that corresponds to the control signal and a state exhibited by the object of control differ, the second microcomputer effects control so as to stop operation of the communication section.

In accordance with the vehicle control device of the first aspect, the communication section receives a control signal from the exterior. The first microcomputer controls operation of an object of control based on the control signal received by the communication section, and outputs the control signal to the second microcomputer. In a case in which the state of the object of control that corresponds to the control signal and the state exhibited by the object of control are different, the second microcomputer effects control so as to stop operation of the communication section. Due thereto, in a vehicle control device that has plural microcomputers, even in a case in which an abnormality arises at the first microcomputer that can communicate directly with the exterior of the vehicle control device, notification of the abnormality can be given to the exterior. Concretely, in a case in which the state of the object of control, which is expressed by the control signal outputted from the first microcomputer, and the actual state of the object of control are different, the second microcomputer effects control so as to stop operation of the communication section. Due thereto, the vehicle control device becomes unable to communicate with an external device, and an external device senses that the vehicle control device is not responding, and can sense that an abnormality has arisen at the vehicle control device.

The object of control in a vehicle control device of a second aspect is a relay that is positioned between a first power source and a second power source. Power supply switching can be executed by providing a relay between the first power source and the second power source.

The first microcomputer of a vehicle control device of a third aspect effects control so as to set the relay to an off state in response to the control signal, and outputs the control signal to the second microcomputer, and the second microcomputer acquires a state exhibited by the relay, and, in a case in which a state expressed by the control signal and the state exhibited by the relay differ, effects control so as to stop operation of the communication section. Due thereto, in a case in which the state of the relay expressed by the control signal and the actual state of the relay differ, operation of the communication section is stopped, and the exterior can be notified of the abnormality that has arisen at the vehicle control device.

The first microcomputer of a vehicle control device of a fourth aspect effects control so as to set the relay to an off state in response to the control signal, and outputs the control signal to the second microcomputer, and the second microcomputer acquires a state exhibited by the relay, and, in a case in which the state exhibited by the relay is the off state, and a state expressed by the control signal and the state exhibited by the relay are the same, outputs an interlock signal for causing the off state of the relay to continue. Due thereto, in a case in which the state of the relay expressed by the control signal and the actual state of the relay are the same, the state of the relay can be interlocked.

At a time when the first microcomputer of a vehicle control device of a fifth aspect effects control so as to set the relay to an off state, the first microcomputer effects control so as to set the relay in the off state in a case in which a voltage value at the first power source side of the relay is greater than or equal to a predetermined value. Due thereto, switching of the power supply can be carried out smoothly.

A vehicle control method of a sixth aspect is a vehicle control method executed in a vehicle control device that has a communication section, a first microcomputer that can communicate with an exterior via the communication section, and a second microcomputer that cannot communicate directly with the exterior and can communicate with the first microcomputer, the method including: the communication section receiving a control signal from the exterior; based on the control signal received by the communication section, the first microcomputer controlling operation of an object of control, and outputting the control signal to the second microcomputer; and, in a case in which a state of the object of control that corresponds to the control signal and a state exhibited by the object of control differ, the second microcomputer effecting control so as to stop operation of the communication section.

A vehicle control program of a seventh aspect is a vehicle control program for causing a second microcomputer of a vehicle control device, which has a communication section, a first microcomputer that can communicate with an exterior via the communication section, and the second microcomputer that cannot communicate directly with the exterior and can communicate with the first microcomputer, to execute processings including: the communication section receiving a control signal from the exterior; based on the control signal received by the communication section, the first microcomputer controlling operation of an object of control, and outputting the control signal to the second microcomputer; and, in a case in which a state of the object of control that corresponds to the control signal and a state exhibited by the object of control differ, the second microcomputer effecting control so as to stop operation of the communication section.

As described above, in accordance with the present disclosure, there is the effect that, in a device that has plural microcomputers, even in a case in which an abnormality arises at a microcomputer that can communicate directly with the exterior of the device, notification of the abnormality can be given to the exterior.

DETAILED DESCRIPTION (Vehicle Control System)

Figure 1:
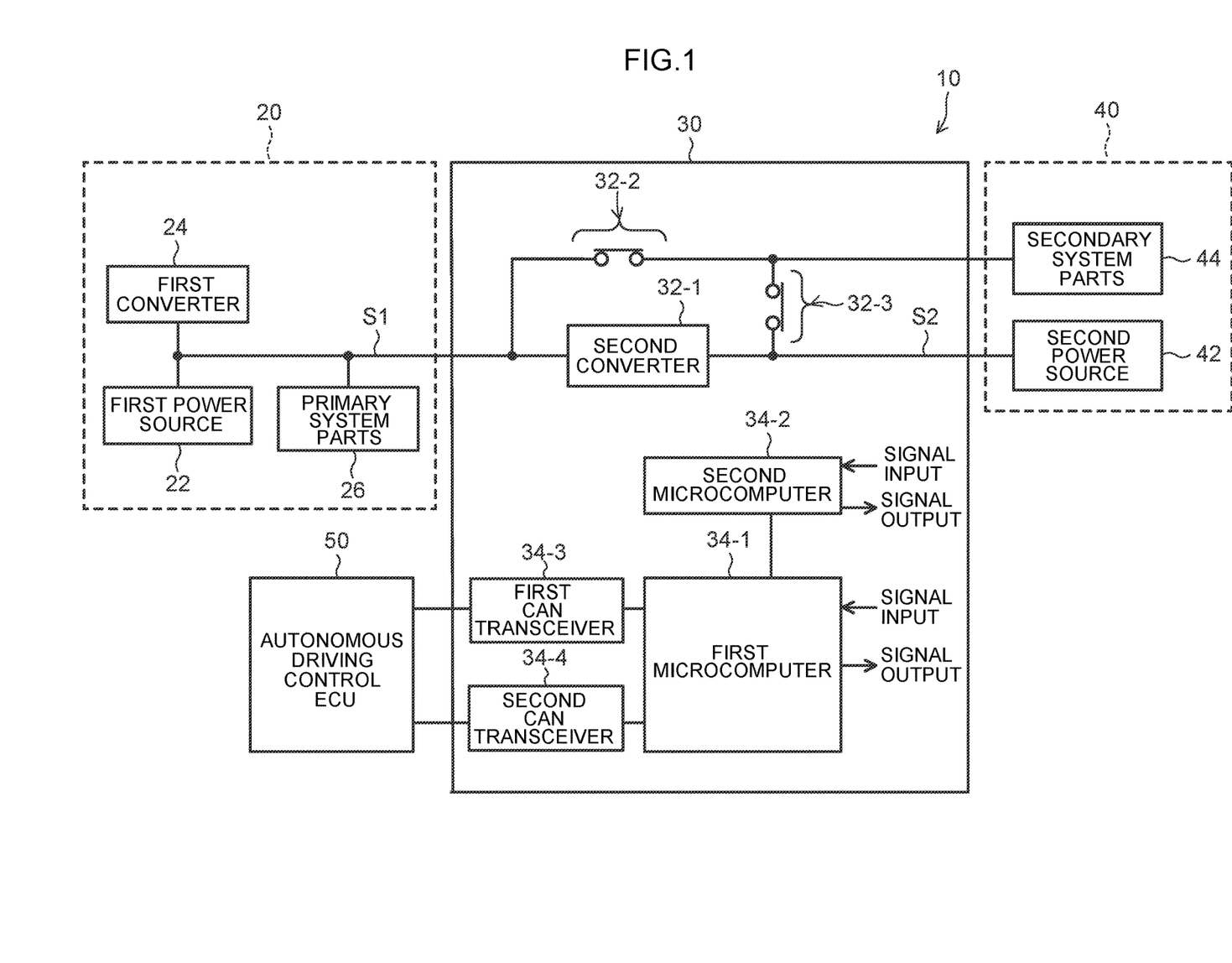
FIG. 1 is a schematic block drawing of a vehicle control system relating to an embodiment.

FIG. 1 is a block drawing showing an example of functional structures of a vehicle control system 10 relating to an embodiment. As shown in FIG. 1, the vehicle control system 10 has a primary system 20, a vehicle control device 30, a secondary system 40, and an autonomous driving control ECU (Electronic Control Unit) 50. The vehicle control system 10 is installed in a vehicle. Further, the vehicle control device 30 is an ECU.

As shown in FIG. 1, the primary system 20 has a first power source 22, a first converter 24, and primary system parts 26. The first converter 24 is, for example, a DCDC converter for an HV (hybrid vehicle).

The vehicle control device 30 has a second converter 32-1, a first relay 32-2 and a second relay 32-3. The second converter 32-1 is a bidirectional DC/DC converter. Further, the vehicle control device 30 has a first microcomputer 34-1, a second microcomputer 34-2, a first CAN (Controller Area Network) transceiver 34-3 and a second CAN transceiver 34-4. The data that is communicated at the first CAN transceiver 34-3 and the data that is communicated at the second CAN transceiver 34-4 are data of the same contents. The first CAN transceiver 34-3 and the second CAN transceiver 34-4 are examples of the communication section.

Note that communication lines do not exist between the second microcomputer 34-2, and the first CAN transceiver 34-3 and the second CAN transceiver 34-4. Therefore, the second microcomputer 34-2 cannot communicate directly with the exterior via the first CAN transceiver 34-3 or the second CAN transceiver 34-4. On the other hand, the second microcomputer 34-2 is structured so as to be able to control the operations of the first CAN transceiver 34-3 or the second CAN transceiver 34-4. For example, by executing STB (Set Top Box) control with respect to the respective transceivers, the second microcomputer 34-2 can stop the operations of the respective transceivers (e.g., can cause the transceivers to transition to standby modes).

The vehicle control device 30 of the vehicle control system 10 of the present embodiment can switch the power supply at the time of switching from usual driving to autonomous driving. Note that usual driving is manual driving by an occupant of the vehicle.

Figure 2:
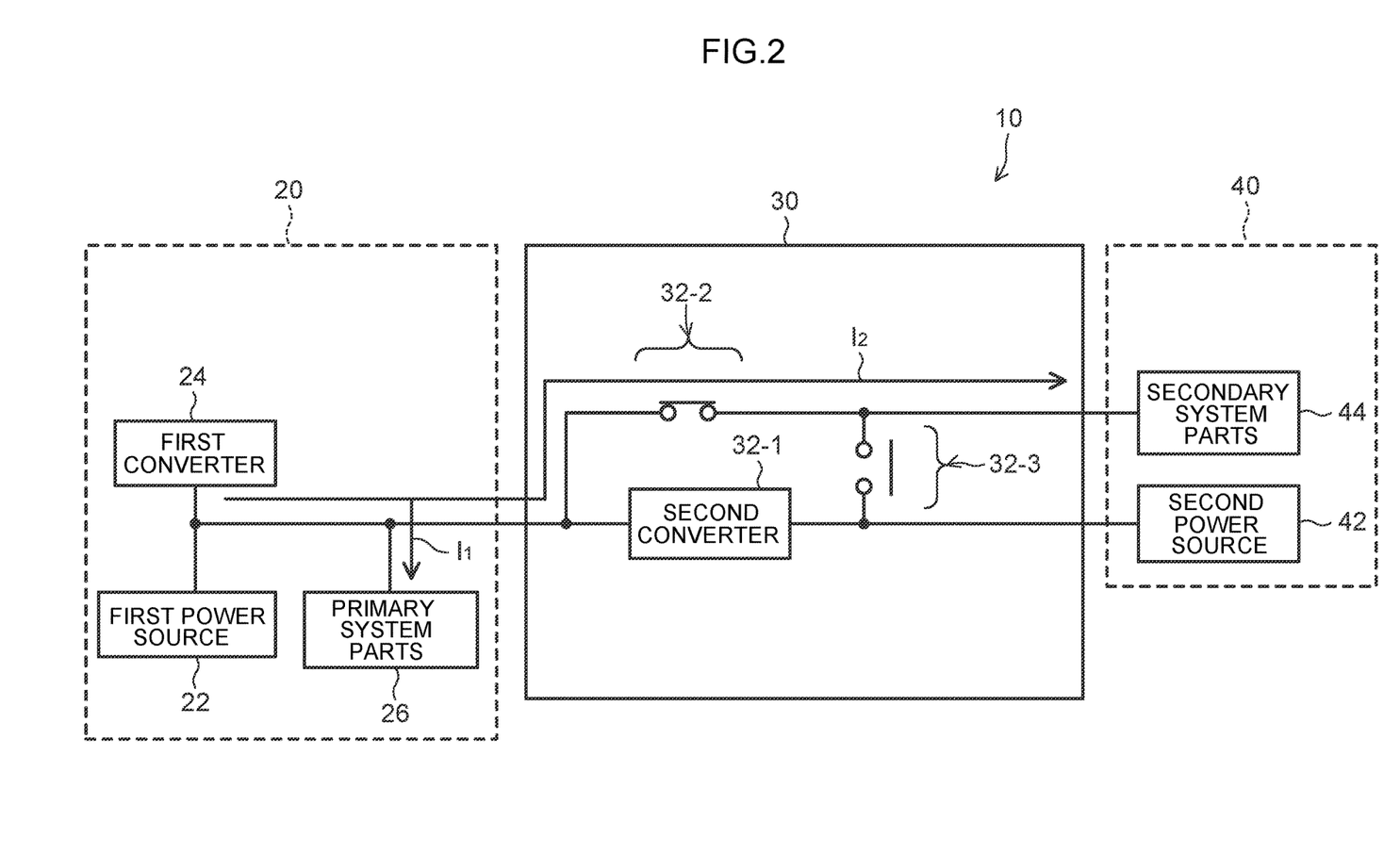
FIG. 2 is a drawing for explaining the flow of current.
Figure 3:
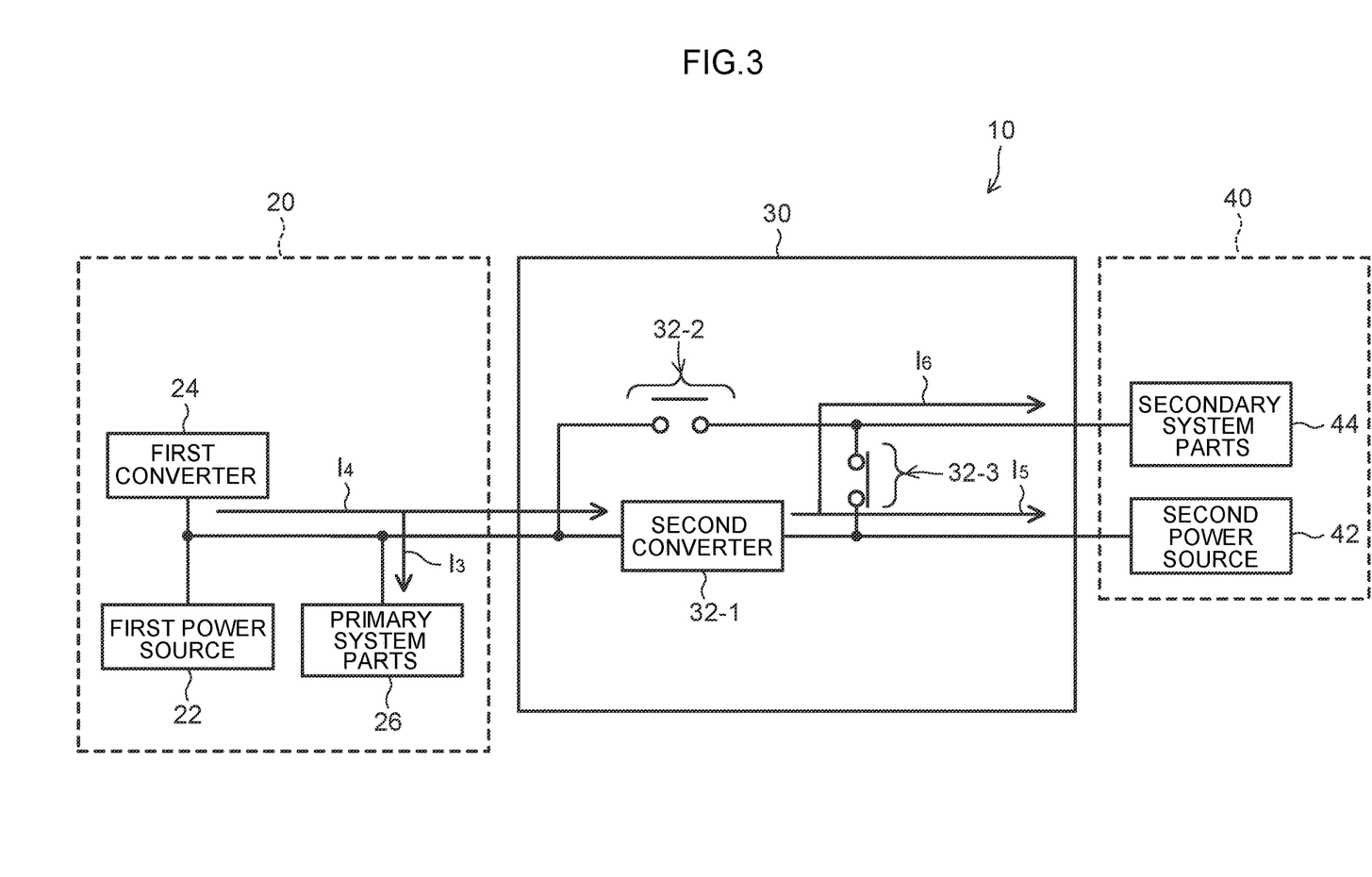
FIG. 3 is a drawing for explaining the flow of current.

Drawings for explaining the flow of current are shown in FIG. 2 and FIG. 3. FIG. 2 is the flow of current in a case in which the state of the vehicle is the usual driving state. In a case in which the state of the vehicle is the usual driving state, as shown in FIG. 2, the first relay 32-2 is in an on state, and the second relay 32-3 is to an off state. In this case, power is supplied from the first power source 22 and the first converter 24 to the primary system parts 26, and current $I_1$ flows into the primary system parts 26. Further, power is supplied from the first power source 22 and the first converter 24 to the secondary system parts 44, and current $I_2$ flows into the secondary system parts 44. Note that charging of the second power source 42 is carried out due to current flowing into the second power source 42 as well from the first power source 22 and the first converter 24 via the second converter 32-1.

On the other hand, FIG. 3 is the flow of current in a case in which the state of the vehicle is the autonomous driving state. In a case in which the state of the vehicle is the autonomous driving state, as shown in FIG. 3, the first relay 32-2 is to an off state, and the second relay 32-3 is in an on state. In this case, power is supplied from the first power source 22 and the first converter 24 to the primary system parts 26, and current $I_3$ flows into the primary system parts 26. Further, power is supplied from the first power source 22 and the first converter 24 to the secondary system parts 44, and currents $I_4$ and $I_6$ flow into the secondary system parts 44 via the second converter 32-1. Note that charging of the second power source 42 is carried out due to current $I_5$ flowing into the second power source 42 as well from the first power source 22 and the first converter 24 via the second converter 32-1.

Note that, in the vehicle control system 10, the primary system 20 and the secondary system 40 are connected via the second converter 32-1 such that, in a case in which an abnormality arises at the primary system 20 side, the primary system 20 can be disconnected. In a case in which the primary system 20 is disconnected from the secondary system 40, supplying of power from the primary system 20 to the secondary system 40 cannot be carried out. In this case, as shown in FIG. 3, because the second relay 32-3 is in an on state, power is supplied from the second power source 42 to the secondary system parts 44. This processing of switching the power supply can be executed by, for example, the technique disclosed in JP-A No. 2019-146305.

Note that the first microcomputer 34-1 and the second microcomputer 34-2 in the vehicle control device 30 carry out the above-described power supply control. The first microcomputer 34-1 and the second microcomputer 34-2 receive signals from respective sections that are in the vehicle control device 30. Further, the first microcomputer 34-1 and the second microcomputer 34-2 output control signals for controlling the respective sections that are in the vehicle control device 30.

Further, at the vehicle control device 30, control with respect to the first relay 32-2 is made redundant by the two microcomputers that are the first microcomputer 34-1 and the second microcomputer 34-2. Concretely, as will be described later, the first microcomputer 34-1 controls the on/off state of the first relay 32-2, and the second microcomputer 34-2 executes interlocking of the first relay 32-2.

Here, as shown in FIG. 1, the first microcomputer 34-1 is connected to the first CAN transceiver 34-3 and the second CAN transceiver 34-4, and can communicate directly with the exterior of the vehicle control device 30 via the first CAN transceiver 34-3 and the second CAN transceiver 34-4. Note that the first CAN transceiver 34-3 is connected to the local CAN, and the second CAN transceiver 34-4 is connected to the global CAN.

On the other hand, the second microcomputer 34-2 cannot communicate directly with the exterior. The second microcomputer 34-2 is connected to the first microcomputer 34-1 so as to be able to communicate therewith, and communicates with the exterior via the first microcomputer 34-1.

Here, a case in which an abnormality arises at the first microcomputer 34-1 is considered for example. In this case, because control with respect to the first relay 32-2 is made redundant by the first microcomputer 34-1 and the second microcomputer 34-2, the second microcomputer 34-2 cannot execute control of the first relay 32-2 instead of the first microcomputer 34-1. Moreover, in this case, because the second microcomputer 34-2 cannot communicate directly with the exterior, the second microcomputer 34-2 cannot notify an external ECU that an abnormality has arisen at the first microcomputer 34-1. If the second microcomputer 34-2 were to be structured so as to be able to communicate directly with the exterior, the cost at the time of constructing the vehicle control device 30 would increase.

Thus, in a case in which a control signal is issued from the autonomous driving control ECU 50, if the state of the first relay 32-2 that is expressed by that control signal and the actual state of the first relay 32-2 whose operation is controlled in accordance with the control signal differ, the second microcomputer 34-2 of the vehicle control system 10 of the present embodiment effects control so as to stop the operations of the first CAN transceiver 34-3 and the second CAN transceiver 34-4.

Due thereto, because the operations of the first CAN transceiver 34-3 and the second CAN transceiver 34-4 are stopped, the vehicle control device 30 cannot communicate with an external ECU. The external ECU that is connected to the local CAN and the global CAN senses that the vehicle control device 30 is not responding, and can sense that an abnormality has arisen at the vehicle control device 30. Accordingly, in accordance with the present embodiment, in a device that has plural microcomputers, even in a case in which an abnormality arises at a microcomputer that can directly communicate with the exterior of the device, the exterior can be notified of that abnormality.

The first microcomputer 34-1 and the second microcomputer 34-2 are realized by, for example, semiconductor integrated circuits, and, more specifically, by Application Specific Integrated Circuits (ASICs) or the like.

Figure 4:
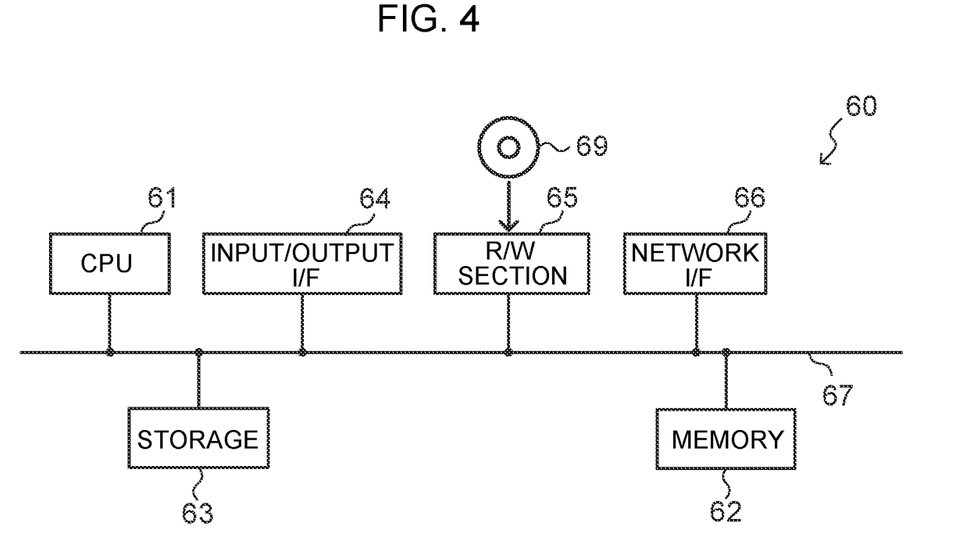
FIG. 4 is a drawing showing a structural example of a computer of each device relating to the embodiment.

Note that the first microcomputer 34-1 and the second microcomputer 34-2 can also be realized by, for example, a computer 60 such as shown in FIG. 4. The computer 60 that realizes the first microcomputer 34-1 and the second microcomputer 34-2 has a Central Processing Unit (CPU) 61, a memory 62 serving as a temporary storage area, and a non-volatile storage 63. Further, the computer has an input/output interface (I/F) 64 to which input/output devices and the like (not shown) are connected, and a read/write (R/W) section 65 that controls the reading and writing of data from and to a recording medium 69. Moreover, the computer has a network I/F 66 that is connected to a network such as the internet or the like. The CPU 61, the memory 62, the storage 63, the input/output I/F 64, the R/W section 65, and the network I/F 66 are connected to one another via a bus 67.

The storage 63 can be realized by a Hard Disk Drive (HDD), a Solid State Drive (SSD), a flash memory or the like. Programs for making the computer function are stored in the storage 63 that serves as a storage medium. The CPU 61 reads-out a program from the storage 63, expands the program in the memory 62, and successively executes the processes that the program has.

Operation of the vehicle control system 10 of the embodiment is described next.

Figure 5:
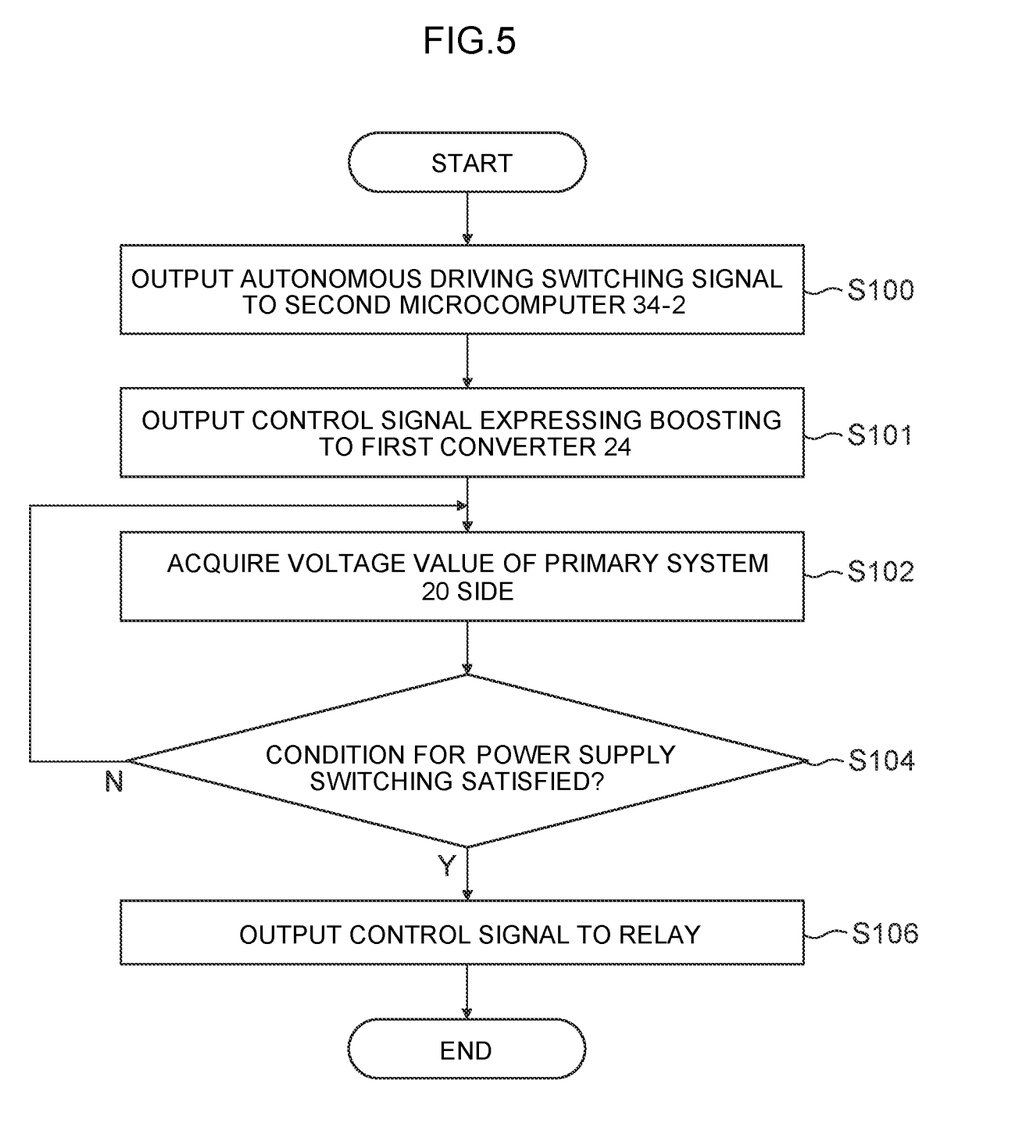
FIG. 5 is an example of processing carried out at a vehicle control device.

In a case in which the driving state of the vehicle is switched from the usual driving state to the autonomous driving state, the autonomous driving control ECU 50 outputs an autonomous driving switching signal, which expresses switching from usual driving to autonomous driving, to the vehicle control device 30. When the first microcomputer 34-1 of the vehicle control device 30 receives the autonomous driving switching signal, the first microcomputer 34-1 executes the processings that are shown in FIG. 5.

Note that the first microcomputer 34-1 of the vehicle control device 30 receives control signals, which are issued from the autonomous driving control ECU 50, via the first CAN transceiver 34-3 and the second CAN transceiver 34-4, respectively. In this case, the first microcomputer 34-1 executes the processing shown in FIG. 5 in a case of receiving an autonomous driving switching signal via either one of the first CAN transceiver 34-3 and the second CAN transceiver 34-4. Note that, in a case in which the control signal received via the first CAN transceiver 34-3 and the control signal received via the second CAN transceiver 34-4 are contradictory, the first microcomputer 34-1 outputs an abnormality notification signal, which expresses an abnormality, to an external ECU.

In step S100, the first microcomputer 34-1 outputs an autonomous driving switching signal to the second microcomputer 34-2.

In step S101, by outputting a control signal expressing boosting to the first converter 24, the first microcomputer 34-1 effects control so as to boost the voltage of the power supplied from the primary system 20.

Note that the voltage value of the primary system 20 side is lower than the voltage value of the secondary system 40 side. Therefore, at the time of switching the power supply in a live state, it is preferable that the voltage that is supplied from the primary system 20 side matches the voltage of the secondary system 40 side. Therefore, at the time when the first microcomputer 34-1 effects control to set the first relay 32-2 to an off state, due to the first microcomputer 34-1 outputting a control signal expressing boosting to the first converter 24, the first microcomputer 34-1 effects control so as to boost the voltage of the power supplied from the primary system 20.

In step S102, the first microcomputer 34-1 acquires a voltage value of the primary system 20 side. For example, the first microcomputer 34-1 acquires the voltage value of S1 of the primary system 20 side that is shown in FIG. 1. The voltage value of S1 of the primary system 20 side and the voltage value of S2 of the secondary system S2 side are different voltage values.

In step S104, the first microcomputer 34-1 judges whether or not a condition for switching the power supply from the primary system 20 to the secondary system 40 is satisfied. If a condition for switching the power supply is satisfied, the routine moves on to step S106. On the other hand, if a condition for switching the power supply is not satisfied, the routine returns to step S102.

The condition that a voltage value at the first power source 22 side of the first relay 32-2 is greater than or equal to a predetermined value is set as the condition for switching the power supply. For example, the condition that the voltage value of S1 of the primary system 20 side is greater than or equal to a predetermined voltage (e.g., 14V) can be set in advance. Due thereto, the voltage value of the primary system 20 side can be made to match the voltage value of the secondary system 40 side, and smooth switching of the power supply is realized. Note that the condition that there is a case in which a predetermined time period (e.g., 4 seconds) or more has elapsed from the outputting of a control signal to the first converter 24 may be further set as a condition for switching the power supply.

In step S106, the first microcomputer 34-1 controls the operation of the first relay 32-2 that is an example of the object of control, based on the autonomous driving switching signal. Further, the first microcomputer 34-1 controls the operation of the second relay 32-3 based on the autonomous driving switching signal.

Concretely, in step S106, by outputting a control signal to the first relay 32-2, the first microcomputer 34-1 effects control so as to set the first relay 32-2 to an off state. Further, by outputting a control signal to the second relay 32-3, the first microcomputer 34-1 effects control so as to set the second relay 32-3 in an on state. Due thereto, power supply switching is executed, and switching is carried out from the state shown in FIG. 2 to the state shown in FIG. 3.

Figure 6:
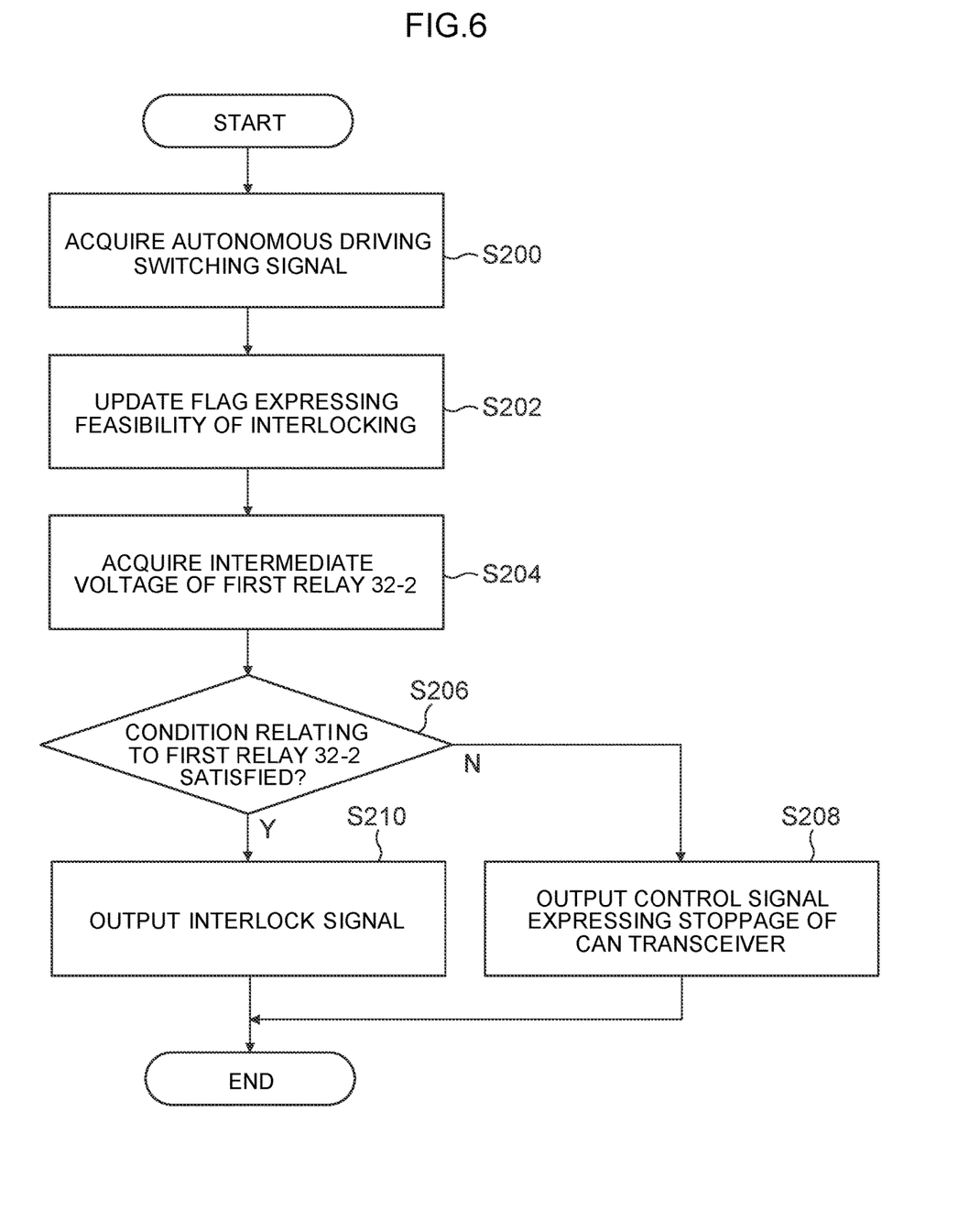
FIG. 6 is an example of processing carried out at the vehicle control device.

Further, when the second microcomputer 34-2 of the vehicle control device 30 receives an autonomous driving switching signal that is outputted from the first microcomputer 34-1, the second microcomputer 34-2 executes the processing shown in FIG. 6.

In step S200, the second microcomputer 34-2 acquires the autonomous driving switching signal that was outputted from the first microcomputer 34-1 in step S100 of above-described FIG. 5.

In step S202, the second microcomputer 34-2 updates a flag that is stored in a predetermined storage (not shown) and that expresses the feasibility of interlocking the first relay 32-2. Concretely, the second microcomputer 34-2 updates the flag that expresses the feasibility of interlocking to the "feasible" state.

When power supply switching is executed, it is preferable to interlock the first relay 32-2 in order to maintain that state. Therefore, in a case in which a predetermined condition is satisfied in the processing that is described hereinafter, the second microcomputer 34-2 interlocks the first relay 32-2.

In step S204, the second microcomputer 34-2 acquires the first relay 32-2 intermediate voltage as an example of the state of the first relay 32-2 that is an example of the object of control.

Figure 7:
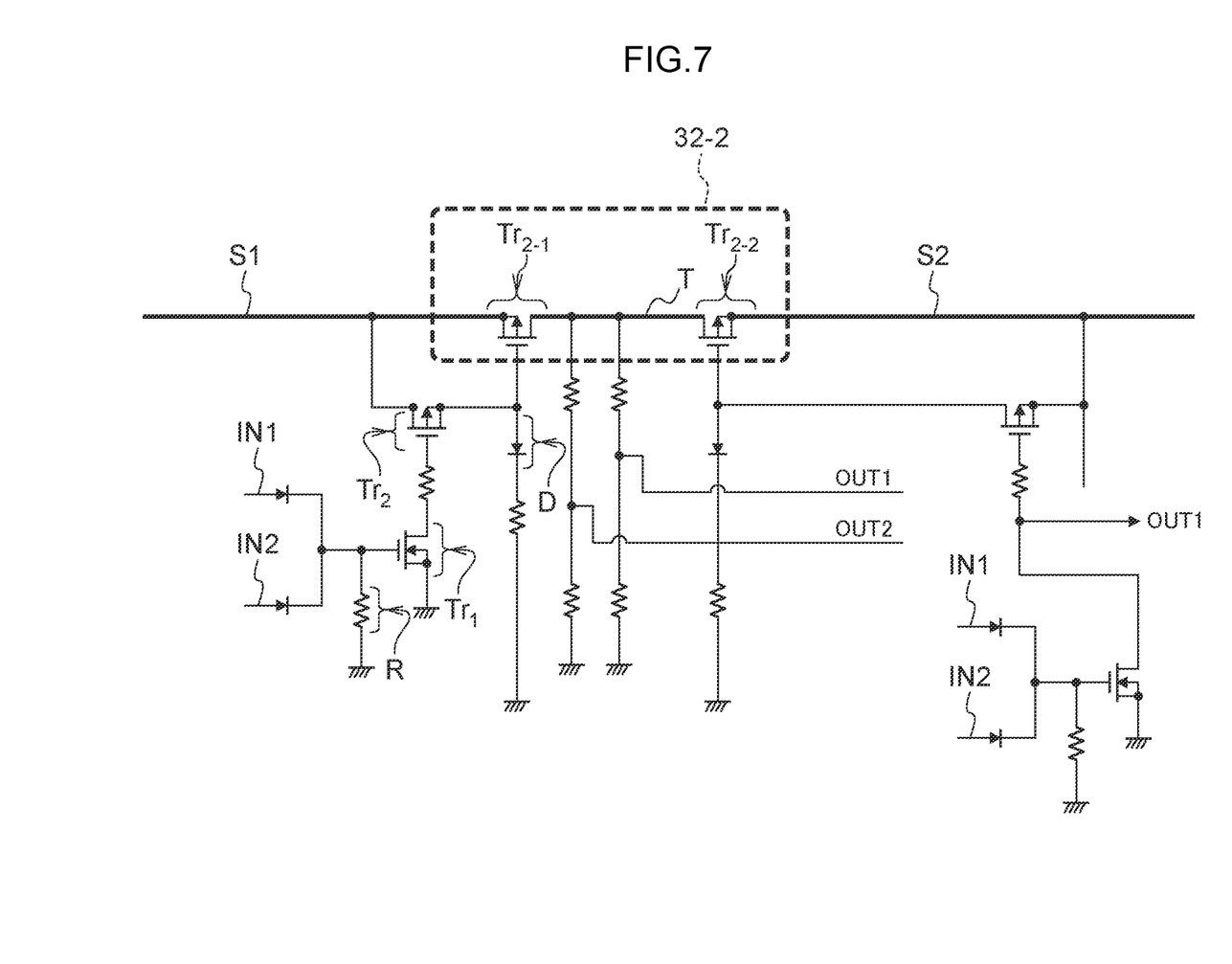
FIG. 7 is an example of an electrical circuit at the periphery of a first relay.

FIG. 7 shows an example of an electrical circuit drawing of the periphery of the first relay 32-2. As shown in FIG. 7, the electrical circuit at the periphery of the first relay 32-2 is structured by transistors $Tr_1$, $Tr_2$, resistor R and diode D. As shown in FIG. 7, the first relay 32-2 is structured by transistor $Tr_{2-1}$ and transistor $Tr_{2-2}$. The transistors $Tr_1$, $Tr_2$ are MOSFETs (Metal-Oxide-Semiconductor Field Effect Transistors).

The second microcomputer 34-2 acquires intermediate voltage T that is between the transistor $Tr_{2-1}$ and the transistor $Tr_{2-2}$ of the first relay 32-2 shown in FIG. 7. Note that OUT1 that is shown in FIG. 7 is the terminal that outputs to the first microcomputer 34-1, and OUT2 is the terminal that outputs to the second microcomputer 34-2. The second microcomputer 34-2 acquires the intermediate voltage T that is outputted from OUT2.

In step S206, the second microcomputer 34-2 judges whether or not a condition relating to the first relay 32-2 is satisfied. In a case in which the condition relating to the first relay 32-2 is not satisfied, the routine moves on to step S208. On the other hand, in a case in which the condition relating to the first relay 32-2 is satisfied, the routine moves on to step S210.

For example, the condition that the intermediate value T of the first relay 32-2 acquired in above step S204 is less than or equal to a predetermined voltage value (e.g., is less than or equal to 3V) and this state has continued for greater than or equal to a predetermined time period (e.g., greater than or equal to 24 ms) is set as the condition relating to the first relay 32-2.

In a case in which an autonomous driving switching signal is issued from the autonomous driving control ECU 50, because the first relay 32-2 is set to an off state in step S106 of FIG. 5, the intermediate voltage T thereof should become zero. However, in a state in which, regardless of the fact that an autonomous driving switching signal has been issued, the intermediate voltage T is a predetermined voltage value or more, and this state has continued for a predetermined time period or more, there is a strong possibility that an abnormality has arisen at the vehicle control device 30 itself. In particular, there is a strong possibility that an autonomous driving switching signal was received and that an abnormality has arisen at the first microcomputer 34-1 that controls the operations of the first relay 32-2.

Therefore, as described above, in a case in which the state of the first relay 32-2 that corresponds to the autonomous driving switching signal and the actual state expressed by the first relay 32-2 are different, the second microcomputer 34-2 effects control so as to stop the operations of the first CAN transceiver 34-3 and the second CAN transceiver 34-4 which are examples of the communication section.

Concretely, in step S208, the second microcomputer 34-2 outputs a control signal that stops operations of the first CAN transceiver 34-3 and the second CAN transceiver 34-4.

Note that, at the time when the second microcomputer 34-2 stops the operations of the first CAN transceiver 34-3 and the second CAN transceiver 34-4, the second microcomputer 34-2 confirms whether an abnormality notification signal that expresses an abnormality is not being outputted from the first microcomputer 34-1 to an external ECU. In a case in which an abnormality notification signal expressing an abnormality is being outputted from the first microcomputer 34-1 to an external ECU, the first microcomputer 34-1 itself is recognizing an abnormality.

For example, in a case in which, after the first microcomputer 34-1 effects control so as to set the first relay 32-2 to an off state, the first microcomputer 34-1 acquires the intermediate voltage T outputted from OUT1 shown in FIG. 7, and the value of the intermediate voltage T is greater than or equal to a predetermined value, the first microcomputer 34-1 outputs an abnormality notification signal expressing an abnormality to the exterior. In this case, because an external ECU is notified that the vehicle control device 30 is abnormal, the second microcomputer 34-2 does not need to stop the operations of the first CAN transceiver 34-3 and the second CAN transceiver 34-4.

Therefore, in a case in which a condition relating to the first relay 32-2 is not satisfied, and an abnormality notification signal that expresses an abnormality is not being outputted from the first microcomputer 34-1 to an external ECU, the second microcomputer 34-2 outputs a control signal that stops the operations of the first CAN transceiver 34-3 and the second CAN transceiver 34-4.

On the other hand, in a case in which a condition relating to the first relay 32-2 is satisfied, the state that the autonomous driving switching signal expresses and the actual state of the first relay 32-2 are the same.

In this case, in step S210, the second microcomputer 34-2 outputs an interlock signal that expresses execution of interlocking for causing the off state of the first relay 32-2 to continue. Note that the second microcomputer 34-2 confirms that the flag expressing the feasibility of interlocking is "feasible", and outputs an interlock signal.

Concretely, due to the second microcomputer 34-2 outputting a control signal to IN2 that is shown in FIG. 7, interlocking is carried out such that the off state of the first relay 32-2 is continued. Note that a control signal that is outputted from the first microcomputer 34-1 is inputted to IN1 that is shown in FIG. 7. If a signal is inputted to at least one of IN12 and IN2, the interlocking by which the off state of the first relay 32-2 is continued is executed, and therefore, even if a control signal is not inputted from the first microcomputer 34-1 to IN1, the off state of the first relay 32-2 is continued.

In this way, in a case in which the state of the first relay 32-2, which is expressed by the control signal outputted from the first microcomputer 34-1, and the actual state of the first relay 32-2, are different, the second microcomputer 34-2 effects control so as to stop the operations of the first CAN transceiver 34-3 and the second CAN transceiver 34-4. Due thereto, the vehicle control device 30 enters into a state in which communication with an external ECU is impossible, and an external ECU that is connected to the local CAN and the global CAN senses that the vehicle control device 30 is not responding, and can sense that an abnormality has arisen at the vehicle control device 30. Further, because there is no need to connect the second microcomputer 34-2 to the local CAN and the global CAN, the cost at the time of constructing the vehicle control device 30 can be reduced.

Further, at the time when the first microcomputer 34-1 executes control with respect to the first relay 32-2, the second microcomputer 34-2 executes interlocking based on the intermediate voltage T that expresses the voltage between two transistors that structure the first relay 32-2. Due thereto, the second microcomputer 34-2 can execute interlocking of the first relay 32-2 without obtaining control information of the first microcomputer 34-1 for the first relay 32-2.

Further, as shown in above-described FIG. 7, diodes are provided at IN1 and IN2, and the circuit for signal input from the first microcomputer 34-1 and the circuit for signal input from the second microcomputer 34-2 are separate. Due thereto, even if, for example, there is trouble such as a circuit at the first microcomputer 34-1 side is grounded or the like, the state of the first relay 32-2 can be maintained due to an interlock signal from the second microcomputer 34-2 being inputted to IN2.

Operation of the vehicle control system 10 at the time of switching from autonomous driving to usual driving is described next.

In a case in which the driving state of the vehicle is switched from autonomous driving to usual driving, the autonomous driving control ECU 50 outputs a usual driving switching signal, which expresses switching from autonomous driving to usual driving, to the vehicle control device 30. When the vehicle control device 30 receives the usual driving switching signal, the vehicle control device 30 executes the processing shown in FIG. 8.

Figure 8:
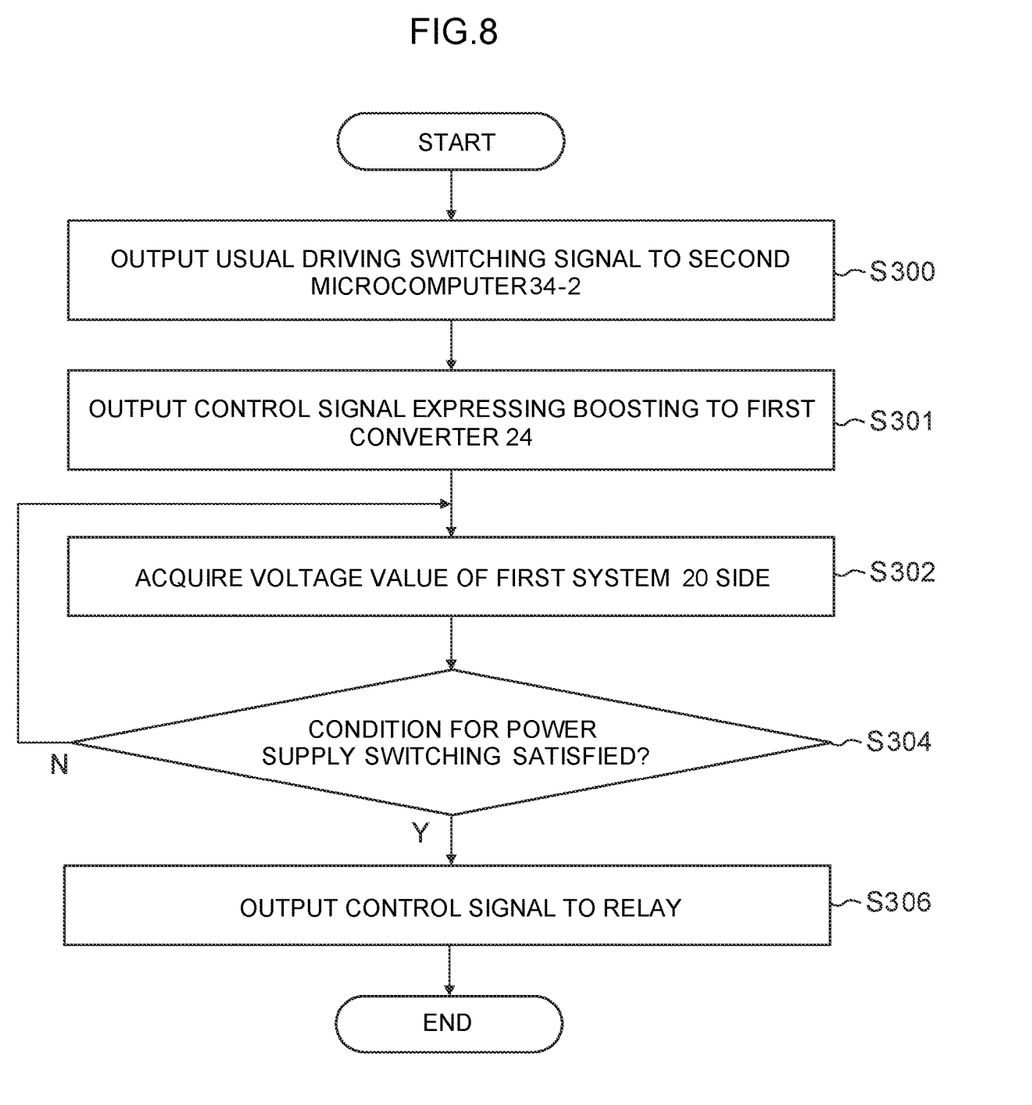
FIG. 8 is an example of processing carried out at the vehicle control device.

In step S300, the first microcomputer 34-1 outputs a usual driving switching signal to the second microcomputer 34-2.

In step S301, by outputting a control signal that expresses boosting to the first converter 24, the first microcomputer 34-1 effects control so as to boost the voltage of the power supplied from the primary system 20.

In step S302, the first microcomputer 34-1 acquires a voltage value of the primary system 20 side. For example, the first microcomputer 34-1 acquires the voltage value of S1 of the primary system 20 side shown in FIG. 1.

In step S304, the first microcomputer 34-1 judges whether or not a condition for switching the power supply from the primary system 20 to the secondary system 40 is satisfied. In a case in which the condition for power supply switching is satisfied, the routine moves on to step S306. On the other hand, in a case in which the condition for power supply switching is not satisfied, the routine returns to step S302.

As described above, the condition that the voltage value of S1 at the primary system 20 side is greater than or equal to a predetermined voltage (e.g., 14 V) can be set in advance as the condition for power supply switching. Note that the condition that a predetermined time period (e.g., 4 seconds)

or more has elapsed from the outputting of the control signal to the first converter 24 may be further set as a condition for power supply switching.

In step S306, based on the usual driving switching signal, the first microcomputer 34-1 controls the operation of the first relay 32-2 that is an example of the object of control. Further, based on the usual driving switching signal, the first microcomputer 34-1 controls the operation of the second relay 32-3.

Concretely, in step S306, by outputting a control signal to the first relay 32-2, the first microcomputer 34-1 effects control so as to set the first relay 32-2 in an on state. Further, by outputting a control signal to the second relay 32-3, the first microcomputer 34-1 effects control so as to set the second relay 32-3 to an off state. Due thereto, power supply switching is executed, and switching from the state shown in FIG. 3 to the state shown in FIG. 2 is carried out.

Figure 9:
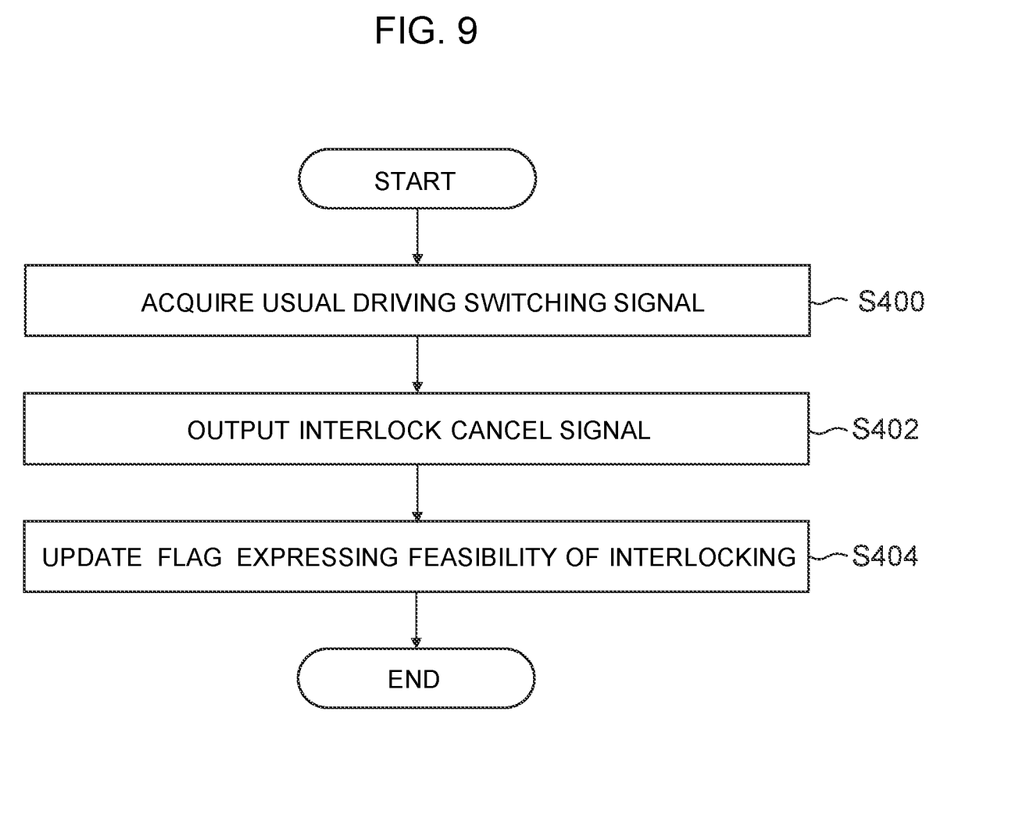
FIG. 9 is an example of processing carried out at the vehicle control device.

When the second microcomputer 34-2 of the vehicle control device 30 receives the usual driving switching signal outputted from the first microcomputer 34-1, the second microcomputer 34-2 executes the processing shown in FIG. 9.

In step S400, the second microcomputer 34-2 acquires the usual driving switching signal that was outputted from the first microcomputer 34-1 in step S300 of above-described FIG. 8.

In step S402, the second microcomputer 34-2 outputs an interlock cancel signal that expresses cancelling of the interlocking of the first relay 32-2.

In step S404, the second microcomputer 34-2 updates the flag that is stored in a predetermined storage (not illustrated) and expresses the feasibility of interlocking the first relay 32-2. Concretely, the second microcomputer 34-2 updates the flag, which expresses the feasibility of interlocking, to "not feasible".

The flag that expresses the feasibility of interlocking is described here.

There are cases in which the autonomous driving switching signal and the usual driving switching signal are issued successively from the autonomous driving control ECU 50. This state is also called so-called hunting. Here, a case is considered in which, for example, a usual driving switching signal and an autonomous driving switching signal are issued successively, and the vehicle control device 30 receives the usual driving switching signal, and, in the midst of power supply switching in accordance with the usual driving switching signal being carried out, an autonomous driving switching signal is received. In this case, there may become a state in which, while the first microcomputer 34-1 is executing power supply switching control from autonomous driving to usual driving based on the usual driving switching signal, the autonomous driving switching signal is received, and the intermediate voltage T of the first relay is less than or equal to a predetermined voltage. In this case, it is assumed that there is a situation in which the second microcomputer 34-2 executes interlocking with respect to the first relay 32-2. Therefore, in the present embodiment, the flag that expresses the feasibility of interlocking is set. The second microcomputer 34-2 updates the flag that expresses the feasibility of interlocking, immediately when receiving the autonomous driving switching signal or the manual driving switching signal. Then, after referring to this flag at the time of executing interlocking of the first relay 32-2, the second microcomputer 34-2 executes the interlocking. Due thereto, the occurrence of a situation such as that described above can be suppressed.

Note that, as shown in above-described FIG. 7, the first relay 32-2 and the second relay 32-3 are structured by MOSFETs. A parasitic diode is formed at a MOSFET.

Figure 10:
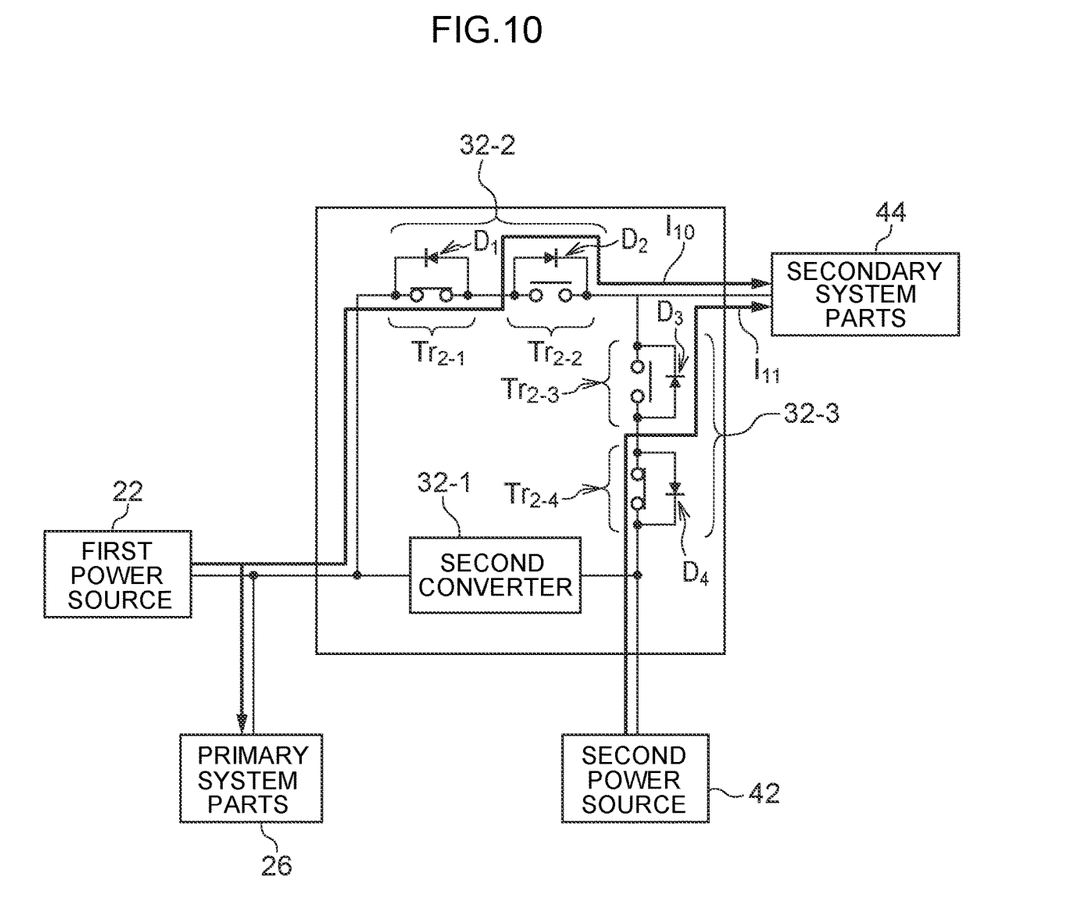
FIG. 10 is a drawing for explaining the flow of current by a parasitic diode.

A drawing for explaining the flow of current, which takes parasitic diodes into consideration, is shown in FIG. 10. As shown in FIG. 10, parasitic diodes $D_1$, $D_2$ are formed at the transistors $Tr_{2-1}$, $Tr_{2-2}$ that structure the first relay 32-2. Further, parasitic diodes $D_3$, $D_4$ are formed also at transistors $Tr_{2-3}$, $Tr_{2-4}$ that structure the second relay 32-3.

Here, as shown in FIG. 10, at the time of switching the power supply, due to the parasitic diode $D_2$ being formed at the one transistor $Tr_{2-2}$ of the first relay 32-2, current $I_{10}$ flows into the secondary system parts 44 even if the transistor $Tr_{2-2}$ is to an off state. Further, as shown in FIG. 10, at the time of switching the power supply, due to the parasitic diode $D_2$ being formed at the one transistor $Tr_{2-3}$ of the second relay 32-3, current $I_{11}$ flows into the secondary system parts 44 even if the transistor $Tr_{2-3}$ is to an off state. Due thereto, the occurrence of momentary interruption of the power supply is suppressed, and power supply switching can be executed in a state in which the power supply is continued.

As described above, the vehicle control system 10 relating to the first embodiment has the first CAN transceiver 34-3 and the second CAN transceiver 34-4 that are examples of the communication section, the first microcomputer 34-1 that can communicate with the exterior via the first CAN transceiver 34-3 and the second CAN transceiver 34-4, and the second microcomputer 34-2 that cannot communicate directly with the exterior and can communicate with the first microcomputer 34-1. The first CAN transceiver 34-3 and the second CAN transceiver 34-4 receive control signals from the exterior. Based on a control signal, the first microcomputer 34-1 controls the operation of the first relay 32-2 that is an example of the object of control, and outputs the control signal to the second microcomputer 34-2. In a case in which the state of the first relay 32-2 that corresponds to the control signal and the state that is exhibited by the first relay 32-2 differ, the second microcomputer 34-2 effects control so as to stop the operations of the first CAN transceiver 34-3 and the second CAN transceiver 34-4. Due thereto, in a device that has plural microcomputers, even in a case in which an abnormality arises at a microcomputer that can communicate directly with the exterior of the device, the exterior can be notified of the abnormality.

Concretely, in a case in which the state of the first relay 32-2, which is expressed by the control signal outputted from the first microcomputer 34-1, and the actual state of the first relay 32-2 are different, the second microcomputer 34-2 effects control so as to stop the operations of the first CAN transceiver 34-3 and the second CAN transceiver 34-4. Due thereto, at the vehicle control device 30, communication with an external ECU becomes impossible, and an external ECU that is connected to the local CAN and the global CAN senses that the vehicle control device 30 is not responding, and can sense that an abnormality has arisen at the vehicle control device 30. Further, because there is no need to connect the second microcomputer 34-2 to the local CAN and the global CAN, the cost at the time of constructing the vehicle control device 30 can be reduced.

Note that description has been given by using, as an example, a case in which the processings that are carried out by the respective devices in the above-described embodiment are executed by hardware, but these processings may be software processings that are carried out by a program being executed. Or, these processings may be processings that combine both software and hardware. In this case, the programs that are stored in a ROM may be stored on any of various types of storage media and distributed.

Moreover, the present disclosure is not limited to the above and may, of course, be implemented by being modified in various ways other than the above, within a scope that does not depart from the gist thereof.

For example, the above-described embodiment describes an example of a case in which the second microcomputer 34-2 acquires the intermediate voltage T between the transistor $Tr_{2-1}$ and the transistor $Tr_{2-2}$ that structure the first relay 32-2, as the actual state of the first relay 32-2. However, the present disclosure is not limited to this. For example, the second microcomputer 34-2 may acquire the current value that flows between the transistor $Tr_{2-1}$ and the transistor $Tr_{2-2}$ that structure the first relay 32-2, and may specify the actual state of the first relay 32-2 based on this current value.

Further, the above-described embodiment describes, as an example, a case in which the control signals that the vehicle control device 30 receives from the exterior are the autonomous driving switching signal and the manual driving switching signal, but the present disclosure is not limited to this, and the control signals may be any type of signals.

All publications, patent applications, and technical standards mentioned in this specification are herein incorporated by reference to the same extent as if each individual publication, patent application, or technical standard was specifically and individually indicated to be incorporated by reference.

What is claimed is:

1. A vehicle control device comprising:
   a communication section;
   a first microcomputer that can communicate with an exterior via the communication section; and
   a second microcomputer that cannot communicate directly with the exterior and can communicate with the first microcomputer,
   wherein:
   the communication section receives a control signal from the exterior,
   based on the control signal received by the communication section, the first microcomputer controls operation of an object of control, and outputs the control signal to the second microcomputer, and
   in a case in which a state of the object of control that corresponds to the control signal and a state exhibited by the object of control differ, the second microcomputer effects control so as to stop operation of the communication section.

2. The vehicle control device of claim 1, wherein the object of control is a relay that is positioned between a first power source and a second power source.

3. The vehicle control device of claim 2, wherein:
   the first microcomputer effects control so as to set the relay to an off state in response to the control signal, and outputs the control signal to the second microcomputer, and
   the second microcomputer acquires a state exhibited by the relay, and, in a case in which a state expressed by the control signal and the state exhibited by the relay differ, effects control so as to stop operation of the communication section.

4. The vehicle control device of claim 2, wherein:
   the first microcomputer effects control so as to set the relay to an off state in response to the control signal, and outputs the control signal to the second microcomputer, and
   the second microcomputer acquires a state exhibited by the relay, and, in a case in which the state exhibited by the relay is the off state, and a state expressed by the control signal and the state exhibited by the relay are the same, outputs an interlock signal for causing the off state of the relay to continue.

5. The vehicle control device of claim 2, wherein, at a time when the first microcomputer effects control so as to set the relay to an off state, the first microcomputer effects control so as to set the relay in the off state in a case in which a voltage value at a first power source side of the relay is greater than or equal to a predetermined value.

6. A vehicle control method executed in a vehicle control device that has:
   a communication section,
   a first microcomputer that can communicate with an exterior via the communication section, and
   a second microcomputer that cannot communicate directly with the exterior and can communicate with the first microcomputer,
   the method comprising:
   the communication section receiving a control signal from the exterior;
   based on the control signal received by the communication section, the first microcomputer controlling operation of an object of control, and outputting the control signal to the second microcomputer; and
   in a case in which a state of the object of control that corresponds to the control signal and a state exhibited by the object of control differ, the second microcomputer effecting control so as to stop operation of the communication section.

7. A recording medium on which is recorded a vehicle control program executable by a second microcomputer of a vehicle control device to perform processing, the vehicle control device having:
   a communication section,
   a first microcomputer that can communicate with an exterior via the communication section, and
   the second microcomputer that cannot communicate directly with the exterior and can communicate with the first microcomputer,
   the processing comprising:
   the communication section receiving a control signal from the exterior;
   based on the control signal received by the communication section, the first microcomputer controlling operation of an object of control, and outputting the control signal to the second microcomputer; and
   in a case in which a state of the object of control that corresponds to the control signal and a state exhibited by the object of control differ, the second microcomputer effecting control so as to stop operation of the communication section.

* * * * *